US012769001B1

(12) United States Patent
Cattani et al.

(10) Patent No.: US 12,769,001 B1
(45) Date of Patent: Oct. 20, 2026

(54) FALSE-POSITIVE OBJECT IDENTIFICATION

(71) Applicant: Zoox, Inc., Foster City, CA (US)

(72) Inventors: Stefano Cattani, San Francisco, CA (US); Shreyas Sudhir Mundhra, San Jose, CA (US); David Pfeiffer, Foster City, CA (US); Jifei Qian, Campbell, CA (US); Arvind Srivastav, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 1097 days.

(21) Appl. No.: 17/876,347

(22) Filed: Jul. 28, 2022

(51) Int. Cl.
*G01S 17/93* (2020.01)
*G01S 7/495* (2006.01)
*G01S 17/931* (2020.01)

(52) U.S. Cl.
CPC ............ *G01S 17/931* (2020.01); *G01S 7/495* (2013.01)

(58) Field of Classification Search
None
See application file for complete search history.

(56) References Cited

U.S. PATENT DOCUMENTS

2022/0157015 A1* 5/2022 Jespersen .............. G01S 17/931
2023/0017983 A1* 1/2023 Kunz .................... G01S 13/931

FOREIGN PATENT DOCUMENTS

WO WO-2022058076 A1 * 3/2022 ........... G01S 7/4802

* cited by examiner

*Primary Examiner* — Hovhannes Baghdasaryan
(74) *Attorney, Agent, or Firm* — Lee & Hayes, P.C.

(57) ABSTRACT

Techniques for identifying false-positives caused by sensor deflection off of reflective surfaces. The techniques may include receiving data indicating a presence of an object in an environment of a vehicle. Based at least in part on the data, a determination may be made that the object is occluded from view by another object in the environment. The techniques may also include determining that a retroreflective surface is located within a threshold proximity of the other object in the environment. Based at least in part on the retroreflective surface being located within the threshold proximity of the other object, a determination may be made that the presence of the object is caused by a false-positive condition associated with a sensor of the vehicle reflecting off of the retroreflective surface. In some instances, the object may be labeled as a false-positive object that is absent from the environment.

17 Claims, 6 Drawing Sheets

FALSE-POSITIVE OBJECT IDENTIFICATION

BACKGROUND

Sensors can be used in various applications for data generation. Many of today's sensors are utilized in different scenarios to determine information associated with an environment. For instance, some of these sensors may be used to determine where buildings or other objects are located in an environment. Although these sensors are reliable in many situations, specific scenarios still exist in which these sensors can experience abnormalities and/or generate unreliable data.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
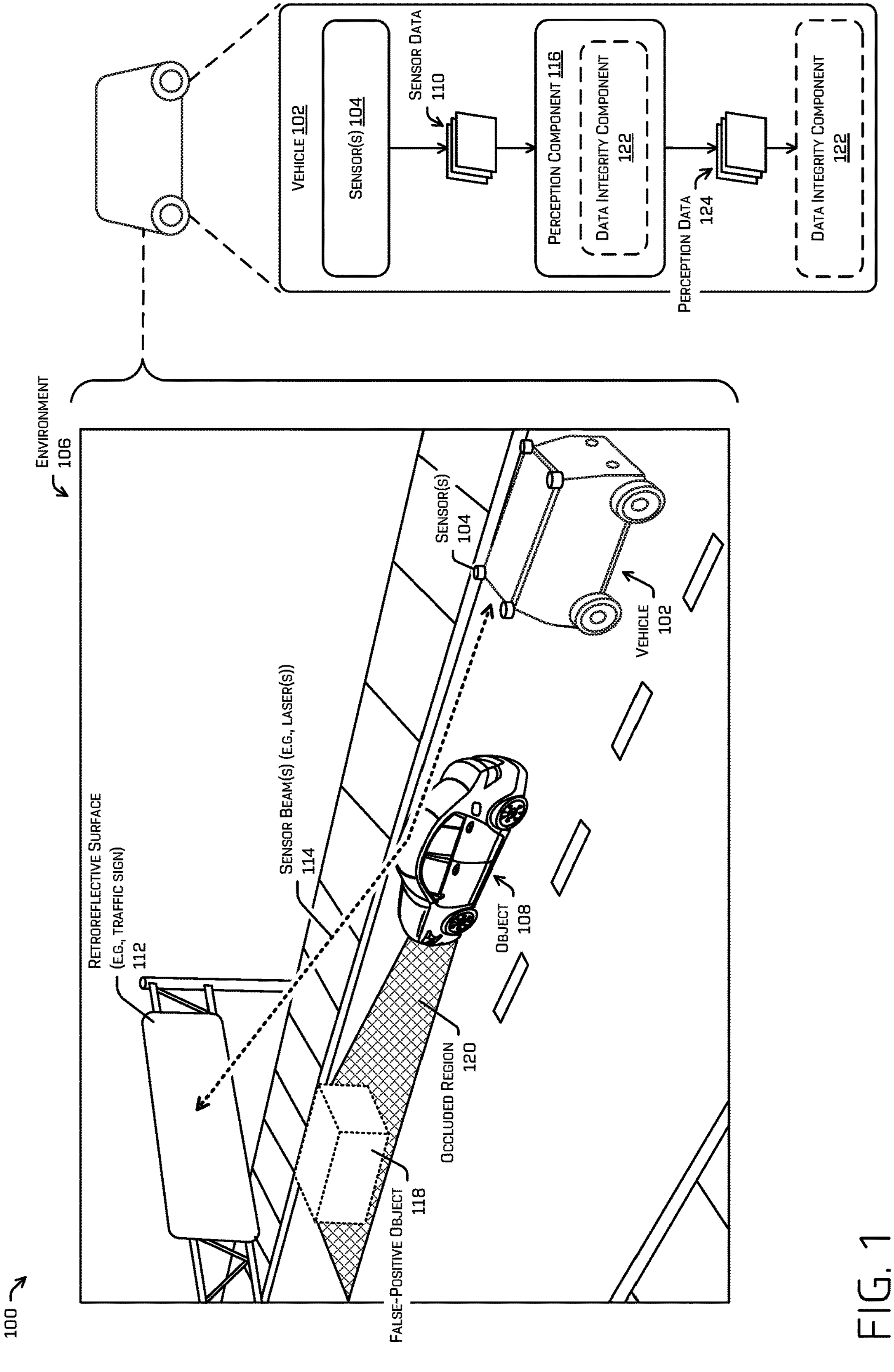
FIG. 1 illustrates an example process associated with identifying false-positive objects in an environment.

As noted above, although today's sensors are reliable in many situations, specific scenarios still exist in which these sensors can experience abnormalities and/or generate unreliable data. One of these scenarios is when one or more of a sensor's beam(s) are deflected off of a first object and then reflected back to the sensor off of a second object. That is, instead of the beam(s) reflecting back to the sensor from the first object they contact, the beam(s) are deflected from the first object to a second object, and then reflected back to the sensor from the second object. When this occurs, the data generated by the sensor can be misleading to downstream devices or components that process or otherwise rely on the sensor data.

This application describes technologies that, among other things, may be used to identify or otherwise determine false-positive objects (e.g., objects that exist in sensor data due to abnormalities but do not actually exist in real-life) caused by sensor data abnormalities, such as those caused by deflected sensor beam(s). For example, sensor data or other data (e.g., perception data) may indicate a presence of an object in an environment in which a vehicle is operating. Based on the sensor data or the other data, a determination may be made that a location associated with the object is within a region of the environment that, from a perspective of a sensor of the vehicle, is occluded from view by another object in the environment. Additionally, a determination may be made that a retroreflective surface (e.g., a traffic sign, a vehicle, an object, etc.) is located within a threshold proximity of the other object in the environment. Based at least in part on the retroreflective surface being located within the threshold proximity of the other object, a determination may be made that the presence of the object is caused by a false-positive condition in which a beam of the sensor deflected off of the other object and reflected, back to the sensor, off of the retroreflective surface. Based on this determination, the object may be labeled or otherwise identified as a false-positive object that is not actually present in the environment.

By way of example, and not limitation, a method according to the technologies described herein may include techniques of receiving data indicating a presence of an object in an environment of a vehicle. In some examples, the data may be raw sensor data generated by a sensor of the vehicle, processed sensor data, or another type of data. For instance, the data may be lidar data generated by a lidar sensor of the vehicle. Alternatively, the data may be perception data generated by a perception component of the vehicle. In the case of lidar data, the lidar data may include one or more three-dimensional point clouds indicating various locations of objects in the environment. In the case of perception data, the perception data may include one or more bounding boxes (e.g., three-dimensional bounding boxes) indicative of locations of objects, orientations of objects, sizes of objects, and the like.

In some examples, the techniques may include determining that the object is occluded from view by another object in the environment. For instance, the object may be located within an occluded region of the environment (e.g., a region of the environment that is not visible from a certain perspective). In some examples, determining that the object is occluded may include determining that the object is occluded from the view of one or more sensors of the vehicle. That is, the one or more sensors of the vehicle may not have a direct line of sight to the object, and the direct line of sight may be obstructed by the other object.

Because the object is occluded from view, it may be abnormal for the sensor data to indicate the presence of the object in the environment. That is, because the object is occluded from view of the sensor, it may be abnormal for a beam of the sensor to generate an observation associated with an object in that location. As such, the techniques may include determining whether the object is a false-positive object or a real object. To determine whether the object is a false-positive object, the techniques may include, in some examples, determining whether a retroreflective surface is present in the environment. In some examples, the data (e.g., the sensor data, the perception data, etc.) may be indicative of a presence and/or a location of the retroreflective surface. Additionally, or alternatively, the presence and/or location of the retroreflective surface may be determined based at least in part on map data associated with the environment in which the vehicle is operating. For instance, the map data may indicate respective locations in the environment where known, retroreflective surfaces (e.g., traffic signs) are located. In some examples, the presence and/or location of the retroreflective surface may be additionally, or alternatively, determined based at least in part on image data captured by an image sensor (e.g., camera) of the vehicle.

In examples, the techniques may include determining that the presence of the object is caused by a false positive condition associated with a beam of the sensor of the vehicle reflecting off of the retroreflective surface. For instance, in some examples the sensor may be a lidar sensor and the false-positive condition may be caused by a laser emitted from the lidar sensor being deflected off of the other object and then reflected off of the retroreflective surface. In some instances, determining that the presence of the object is caused by the false positive condition may be based at least in part on a determination that a geometrical relationship exists between the location of the object, the location of the other object, and the location of the retroreflective surface. For example, respective distances may be determined between the retroreflective surface and the other object based on sensor data, as well as between the object and the other object, and if the distance between the retroreflective surface and the other object is roughly the same as the distance between the object and the other object, then this may be a factor in determining whether the geometrical relationship exists that is indicative of the false-positive. In examples, a distance may be determined based on the amount of time it takes for a sensor beam to report back from a reflecting object. Additionally, another factor in determining whether the geometrical relationship exists may be whether the object is occluded from view by the other object. In some examples, whether the retroreflective surface is located within a threshold proximity of the object, the other object, or the vehicle may be confirmed by determining the existence of the geometrical relationship. In some examples, another factor in determining that the presence of the object is caused by the false positive condition may be based at least in part on a velocity associated with the object. For instance, if the velocity associated with the object is less than a threshold velocity, or is relatively static (e.g., not moving), then this may be a factor contributing to the object being a false-positive. In some instances, the velocity associated with the object may be determined to be less than relative velocities of other objects in the environment, and this may be a contributing factor. Additionally, or alternatively, determining that the presence of the object is caused by the false positive condition may be based at least in part on a determination that a difference in size between the object and the other object is less than a threshold difference. In examples, the size of the false-positive object may generally be larger than the deflecting object because a sensor beam of the vehicle may have a tendency to “fan out” or otherwise spread out based on a distance to a reflected object. That is, as an object gets further and further away from a sensor, the amount of sensor beams that reflect off the object will be less than if the object were closer. This may be dependent, however, on a frequency in which the sensor radiates one or more beams for generating observations.

In some examples, the techniques may include labeling the object as a false-positive object. For instance, the object may be labeled in perception data as a false-positive object so that downstream components, such as a planner component, prediction component, etc. of the vehicle does not give any deference to the false-positive object. Additionally, or alternatively, in some examples, the false-positive object may be removed from the perception data or the sensor data. For instance, a bounding box associated with the false-positive object may be removed from the perception data, or a point cloud may be removed from lidar data representing the object.

According to the techniques described herein, several advantages in computer-related technology may be realized. For instance, by identifying false-positive objects, processing power may be conserved by downstream components (e.g., planner component, prediction component, etc.) not having to process data associated with the false-positive object and/or treat the false-positive object as it would otherwise treat a real object. This allows the downstream computing devices and/or components to operate with greater efficiency by refraining from wasting compute power processing data associated with an object that does not actually exist.

Additionally, the techniques described herein improve the safe operation of autonomous vehicles. For instance, by identifying false-positive objects, a planner component of a vehicle can more accurately determine planned trajectories for the vehicle to follow in the environment, without those trajectories being affected by the presence of false-positive objects. Additionally, by identifying which objects are false-positive objects, the behavior of an autonomous vehicle can more closely resemble that of a human-operated vehicle, which would not change its trajectory to compensate for an object that is not actually present in an environment.

The techniques described herein can be implemented in a number of ways. Example implementations are provided below with reference to the following figures. Example implementations are discussed in the context of autonomous vehicles; however, the methods, apparatuses, and components described herein can be applied to a variety of components (e.g., a sensor component or a robotic platform), and are not limited to autonomous vehicles. For example, the techniques can be utilized in semi-autonomous vehicles, driver assistance systems for manually driven vehicles, aviation or nautical contexts, manufacturing contexts, or in other contexts employing temporal sensor systems.

FIG. 1 illustrates an example process 100 associated with identifying false-positive objects in an environment. In examples, the vehicle 102 may include one or more sensor(s) 104. In at least one example, the sensor(s) 104 may capture sensor data associated with an environment 106 surrounding the vehicle 102. In at least one example, the sensor(s) 104 may include lidar sensors (e.g., rotating lidar sensors), radar sensors, rolling shutter image sensors, ultrasonic transducers, sonar sensors, location sensors (e.g., global positioning component (GPS), compass, etc.), inertial sensors (e.g., inertial measurement units, accelerometers, magnetometers, gyroscopes, etc.), cameras (e.g., RGB, IR, intensity, depth, etc.), wheel encoders, microphones, environment sensors (e.g., temperature sensors, humidity sensors, light sensors, pressure sensors, etc.), time of flight (ToF) sensors, etc. In some examples, one or more of the sensor(s) 104 may be housed within one or more sensor pods coupled to the vehicle. In some instances, a sensor pod may include one or more lidar sensors, image sensors, radar sensors, time of flight sensors, accelerometers, or the like. The sensor(s) 104 may generate sensor data 110 associated with the environment 106, which may include, but is not limited to, lidar data, radar data, ultrasonic transducer data, sonar data, location data (e.g., global positioning component (GPS), compass, etc.), pose data, inertial data (e.g., inertial measurement units data, accelerometer data, magnetometer data, gyroscope data, etc.), image data (e.g., RGB data, IR data, intensity data, depth data, etc.), wheel encoder data, microphone data, environment sensor data (e.g., temperature sensor data, humidity sensor data, light sensor data, pressure sensor data, etc.), ToF sensor data, etc.

In examples, the environment 106 may include one or more objects, such as the object 108 that represents another vehicle, as well as pedestrians, cyclists, animals, vegetation, buildings, streetlights, street signs, etc. In some examples, the environment 106 may also include one or more retroreflective surfaces, such as the retroreflective surface 112. The retroreflective surface 112 shown in FIG. 1 represents a traffic sign, but other retroreflective surfaces and/or retroreflective objects are possible. As used herein, a "retroreflective surface" includes any surface, material, or device that is capable of reflecting light or other radiation back towards its source. Additionally, it is to be appreciated that the techniques of this disclosure are possible in the absence of a retroreflective surface, and the techniques of this disclosure may be possible in cases such as when a reflective surface reflects light or other radiation back towards its source.

In some examples, one or more of the sensor(s) 104 of the vehicle 102 may radiate one or more sensor beam(s) 114 in the environment 106 to generate the sensor data 110. For instance, a lidar sensor may generate lidar data associated with the environment 106 by targeting areas of the environment 106 with one or more laser(s) and measuring the time for the reflected laser(s) to return to the lidar sensor. In some instances, these sensor beam(s) 114 may deflect off the object 108 and reflect back to the sensor(s) 104 off of the retroreflective surface 112. That is, the sensor beam(s) 114 may be emitted from a sensor of the vehicle 102, deflect off the object 108, reflect off the retroreflective surface 112, and then deflect again off the object 108 back to the sensor of the vehicle 102.

In such examples as described above, and herein, when a sensor beam 114 is deflected off an object 108 and then reflected back to the sensor 104 from a retroreflective surface 112, the sensor data 110 captured by the sensor(s) 104 may cause a perception component 116 of the vehicle 102 to erroneously detect a false-positive object 118 in the environment 106. In examples, the perception component 116 may determine that the false-positive object 118 is located within an occluded region 120 of the environment 106. That is, the occluded region 120 may be a region of the environment 106 that is not visible with respect to one or more of the sensor(s) 104 of the vehicle 102.

In some examples, the vehicle 102 may include a data integrity component 122, which may be configured to identify false-positive objects 118 within sensor data 110 and/or perception data 124. In some examples, the data integrity component 122 may be part of the perception component 116 of the vehicle 102, or the data integrity component 122 may be a standalone component. As such, in some instances, the data integrity component 122 may receive sensor data 110 as inputs and/or may receive perception data 124 as inputs. In the case of sensor data 110, the sensor data 110 may be lidar data that includes one or more three-dimensional point clouds indicative of various locations of objects in the environment. In the case of perception data 124, the perception data 124 may include one or more bounding boxes (e.g., three-dimensional bounding boxes) indicative of locations of objects in the environment, orientations of objects, sizes of objects, and the like.

In some examples, the data integrity component 122 may determine whether an object is a false-positive object 118 based at least in part on determining that a candidate object (e.g., an object that is potentially a false-positive object, but not confirmed) is occluded from view by another object in the environment. For instance, data integrity component 122 may determine that the candidate object is located within the occluded region 120 of the environment 106. In some examples, the occluded region 120 may be a region of the environment 106 in which not a single sensor 104 of the vehicle 102 has visibility into.

Additionally, in some examples, the data integrity component 122 may determine that the candidate object is the false-positive object 118 based at least in part on determining that the retroreflective surface 112 is located within a threshold proximity of the object 108. That is, if a candidate object is detected within an occluded region 120, and if a retroreflective surface 112 is located within the threshold proximity of the object 108, then this may be a factor weighing in favor of the candidate object being a false-positive object 118. In some examples, the sensor data 110 or the perception data 124 may be indicative of a presence of the retroreflective surface 112 and/or a location of the retroreflective surface 112, and this data may be used by the data integrity component 122 to determine whether the retroreflective surface 112 is within the threshold proximity. Additionally, or alternatively, the presence and/or location of the retroreflective surface 112 may be determined by the data integrity component 122 based at least in part on map data associated with the environment 106. For instance, the map data may indicate respective locations in the environment 106 where known objects having retroreflective surfaces (e.g., traffic signs) are located, as well as the angles of orientation of such objects with respect to a roadway. As such, the data integrity component 122 may utilize the map data and, in some instances, the sensor data 110 and/or the perception data 124 to determine the location and/or angle of the retroreflective surface 112. In some examples, the presence, location and/or angle of the retroreflective surface 112 may be determined based at least in part on data captured by a sensor (e.g., camera) of the vehicle 102.

In some instances, the data integrity component 122 may determine the threshold proximity based at least in part on a distance between the candidate object (e.g., the false-positive object 128) and the other object 108. By way of example, and not limitation, if the distance between the candidate object and the other object 108 is 20 meters, then the data integrity component 122 may determine the threshold proximity to be 18-22 meters. Additionally, in some instances, determining the threshold proximity may include determining, by the data integrity component 122, a perimeter that is indicative of locations in the environment at which retroreflective surfaces, if located, could contribute to a false-positive object 118. In some examples, the perimeter may be a perimeter of a circle, and the radius of the circle may be equal to the distance between the candidate object and the other object 108. As such, any retroreflective surfaces that are located along the perimeter of the circle, or within a threshold proximity of the perimeter, may be capable of causing the false-positive object 118.

In examples, the data integrity component 122 may determine that the presence of the false-positive object 118 is caused by a false-positive condition associated with the sensor beam(s) 114 of the sensor(s) 104 of the vehicle 102 reflecting off of the retroreflective surface 112. In additional, or alternative, examples, the data integrity component 122 may determine that the candidate object is the false-positive object 118 based at least in part on a determination that a difference in size between the false-positive object 118 and the other object 108 is less than a threshold difference. For instance, in the case of lidar sensors, the sensor beam(s) 114 may be rotated. As such, a size of the false-positive object 118 may be similar to a size of the object 108, or at least that portion of the object 108 that deflects the sensor beam(s) 114. Additionally, or alternatively, in some instances a size of the false-positive object 118 may be similar to that of the retroreflective surface 112. In either of these cases, the size of the false-positive object 118 and the sizes of the object 108 and/or the retroreflective surface 112 may be utilized to determine whether a candidate object is a false-positive object 118.

In some examples, the data integrity component 122 may label the candidate object as the false-positive object 118. For instance, the data integrity component 122 may label the candidate object in the perception data 124 as the false-positive object 118 so that downstream components, such as a planner component, prediction component, etc. of the vehicle 102 do not give any deference to the false-positive object 118. That is, if the perception data 124 is labeled with the false-positive, the downstream components may refrain from altering or otherwise determining a trajectory for the vehicle 102 to follow based on the location of the false-positive object 118. Additionally, or alternatively, in some examples, the data integrity component 122 may remove any data associated with the false-positive object 118 from the perception data 124 and/or the sensor data 110. For instance, a bounding box associated with the false-positive object 118 may be removed from the perception data 124 by the data integrity component 122, or a point cloud associated with the false-positive object 118 may be removed from lidar data by the data integrity component 122.

In some examples, the data integrity component 122 and/or the perception component may determine distances between objects in the environment 106 in order to determine whether a false-positive object 118 is caused by a retroreflective surface 112. For instance, a distance between the vehicle 102 (or the sensor(s) 104) and the retroreflective surface 112 may be measured using lidar, as well as a distance between the vehicle 102/sensor(s) 104 and the object 108 may also be measured. Additionally, azimuth angles associated with the retroreflective surface 112 and the object 108 (as well as any other object) may also be measured. Using this information (distances and azimuths), the perception component 116 and/or the data integrity component 122 may determine a distance between the retroreflective surface 112 and the object 108. This same process may also be used for determining a distance between the object 108 and the false-positive object 118. In examples, these distances (between the retroreflective surface 112 and the object 108, and between the object 108 and the false-positive object 118) should be about equal when a retroreflective surface 112 is causing a false-positive detection. Additionally, these distances may be used to determine the existence of the geometrical relationship described herein that is indicative of a false-positive object 118 caused by a retroreflective surface.

Figure 2:
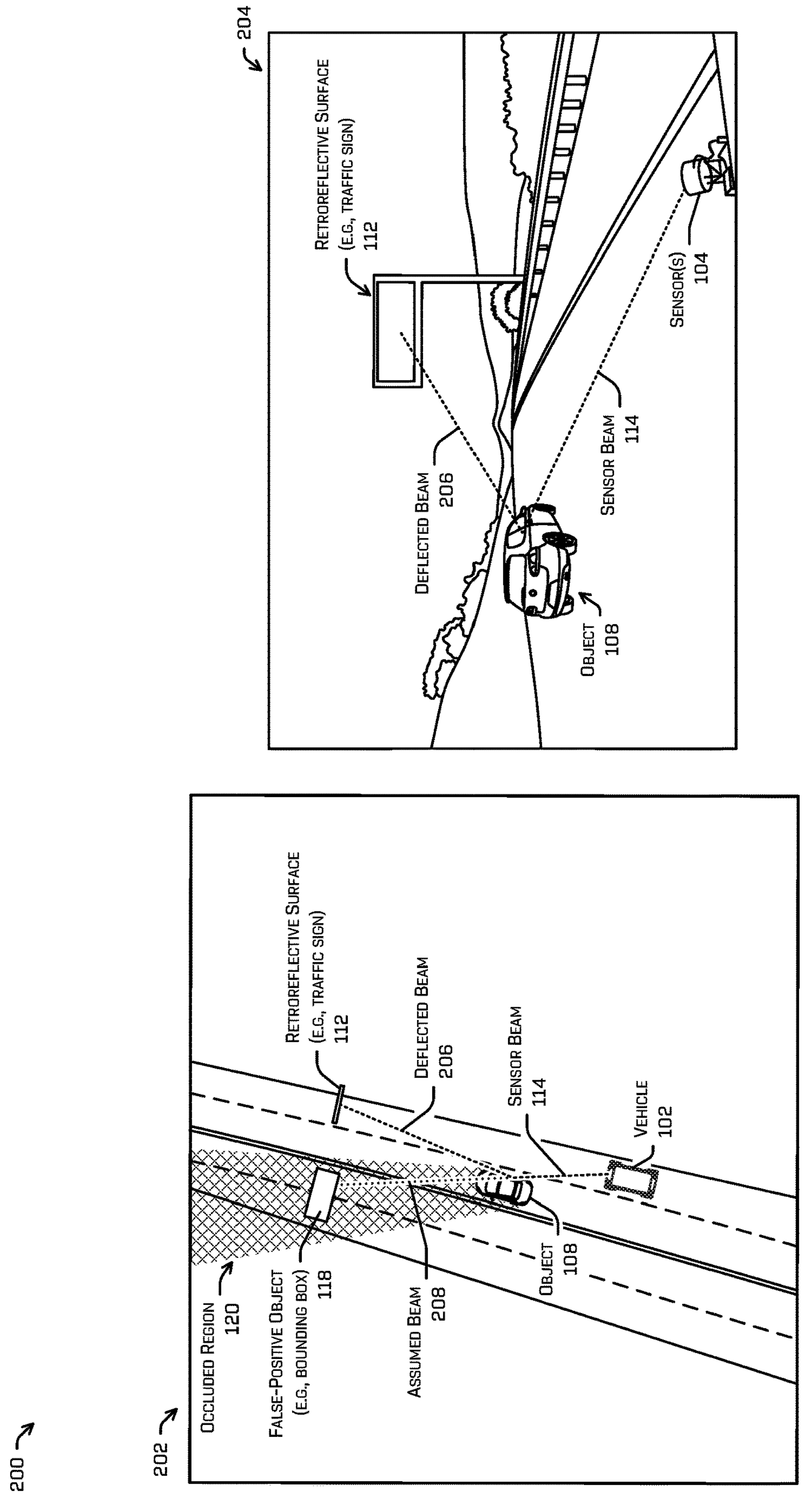
FIG. 2 illustrates an example scenario in which a false-positive object may be detected in an environment. The example scenario is illustrated from both a top-down perspective and a first-person perspective.

FIG. 2 illustrates an example scenario 200 in which a false-positive object may be detected in an environment. The example scenario is illustrated from both a top-down perspective 202 and a first-person perspective 204.

With reference to the top-down perspective 202, the sensor beam 114 is radiated from the vehicle 102 and the sensor beam 114 deflects off the object 108 and then contacts the retroreflective surface 112. However, the sensor(s) 104 and/or components of the vehicle 102 that process the sensor data may not have knowledge of the path of the deflected beam 206, and may presume that the path of the sensor beam 114 corresponds with the path of the assumed beam 208, as shown. As such, as the sensor beam 114 reflects off of the retroreflective surface 112 and back toward the vehicle 102, the components of the vehicle 102 that process the sensor data may detect the retroreflective surface 112 as an object, but the components may determine that the location of the object is where the false-positive object 118 is located (e.g., in the direction of the assumed beam 208).

The first-person perspective 204 illustration further illustrates the path of the sensor beam 114. The sensor beam 114 is projected out from the sensor(s) 104 of the vehicle 102 and deflects off the object 108 in the direction of the deflected beam 206. The path of the deflected beam 206 then contacts the retroreflective surface 112. In some examples, the return path of the deflected beam 206 is the opposite of its outbound path. That is, the beam is reflected from the retroreflective surface 112 back to the object 108, and then deflected back to the sensor(s) 104 of the vehicle 102.

Figure 3:
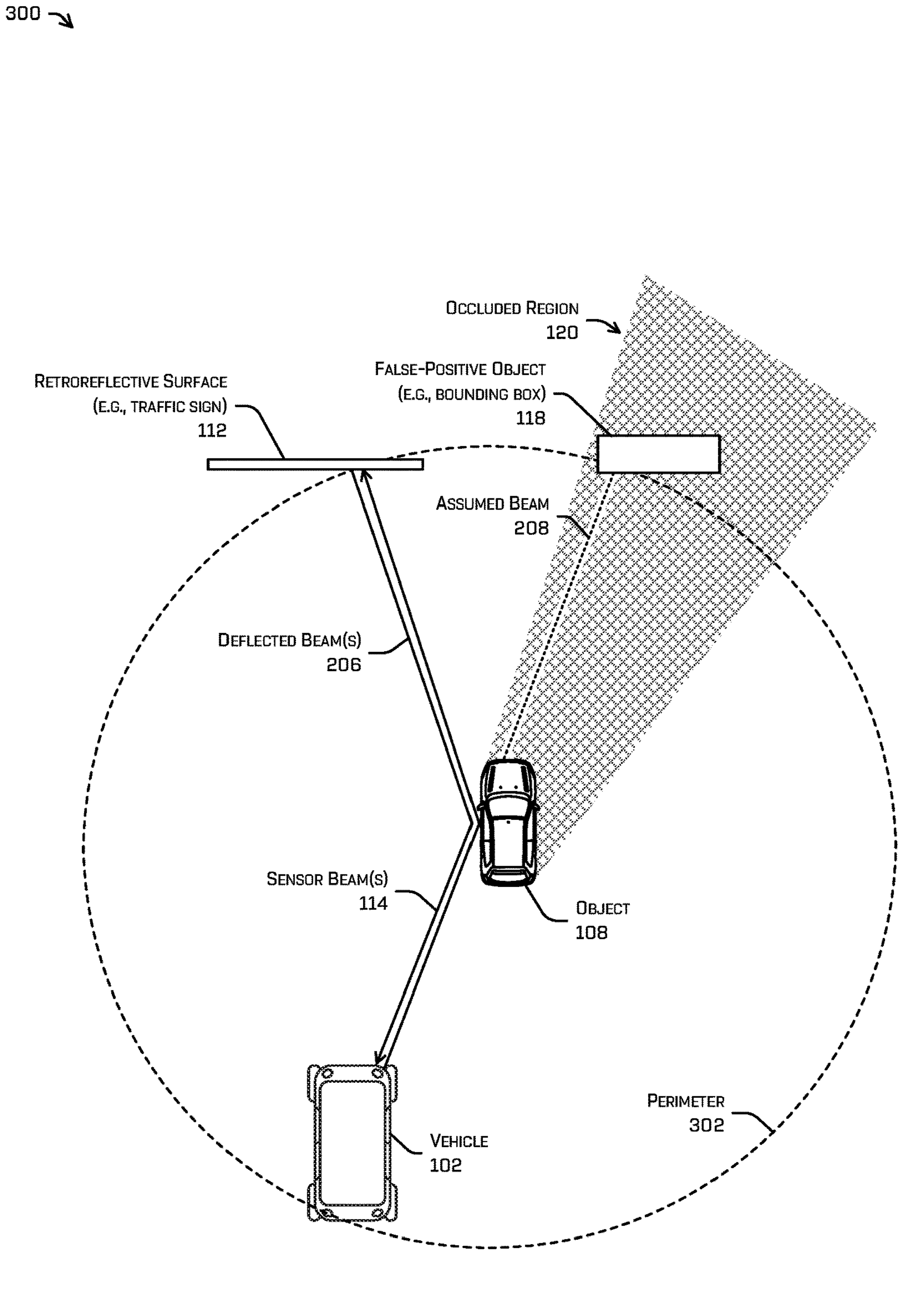
FIG. 3 is a top-down perspective view illustrating a perimeter that may be determined in association with identifying a false-positive.

FIG. 3 is a top-down perspective view 300 illustrating a perimeter 302 that may be determined in association with identifying a false-positive. This top-down perspective view 300 is also illustrative of the geometrical relationship described herein, where a distance between the object 108 and the retroreflective surface 112 is about equal to a distance between the object 108 and the false-positive object 118, and the false-positive object 118 is located in an occluded region 120. In some examples, a radius of the perimeter 302 may be based at least in part on a distance between the object 108 and at least one of the false-positive object 118 or the retroreflective surface 112. In some examples, whether a candidate object is a false-positive object 118 may be determined based at least in part on whether the location of the retroreflective surface 112 lies along the perimeter 302. For instance, responsive to determining that a candidate object is located within an occluded region 120, a distance between the object 108 and the candidate object may be determined, and the perimeter 302 may be determined based on the distance. In some examples, the perimeter 302 may be substantially circular, as shown, and the center of the perimeter 302 may be the point of deflection of the sensor beam(s) 114 off of the object 108.

Additionally, or alternatively, to determine that a candidate object is a false-positive object 118, a determination may be made that a retroreflective surface 112 is present in an environment of the vehicle 102. Based on detecting the presence of the retroreflective object, a distance between the retroreflective surface 112 and an object 108 in the environment may be determined, and the perimeter 302 may be determined based on the distance. Based at least in part on the distance and/or the perimeter 302, a determination may be made as to whether any candidate objects have been detected along the perimeter 302. That is, a determination may be made as to whether any objects have been detected within an occluded region 120 and positioned along the perimeter 302.

In some examples, the occluded region 120 may be a region of the environment that is not visible to any sensors of the vehicle 102. That is, the occluded region 120 may be completely obstructed by the object 108 such that sensor observations cannot be generated for that region. As such, the occluded region 120 may extend from a point where a line of sight of one or more sensors of the vehicle intersect with an interceding object 108, as shown in FIG. 3.

Figure 4:
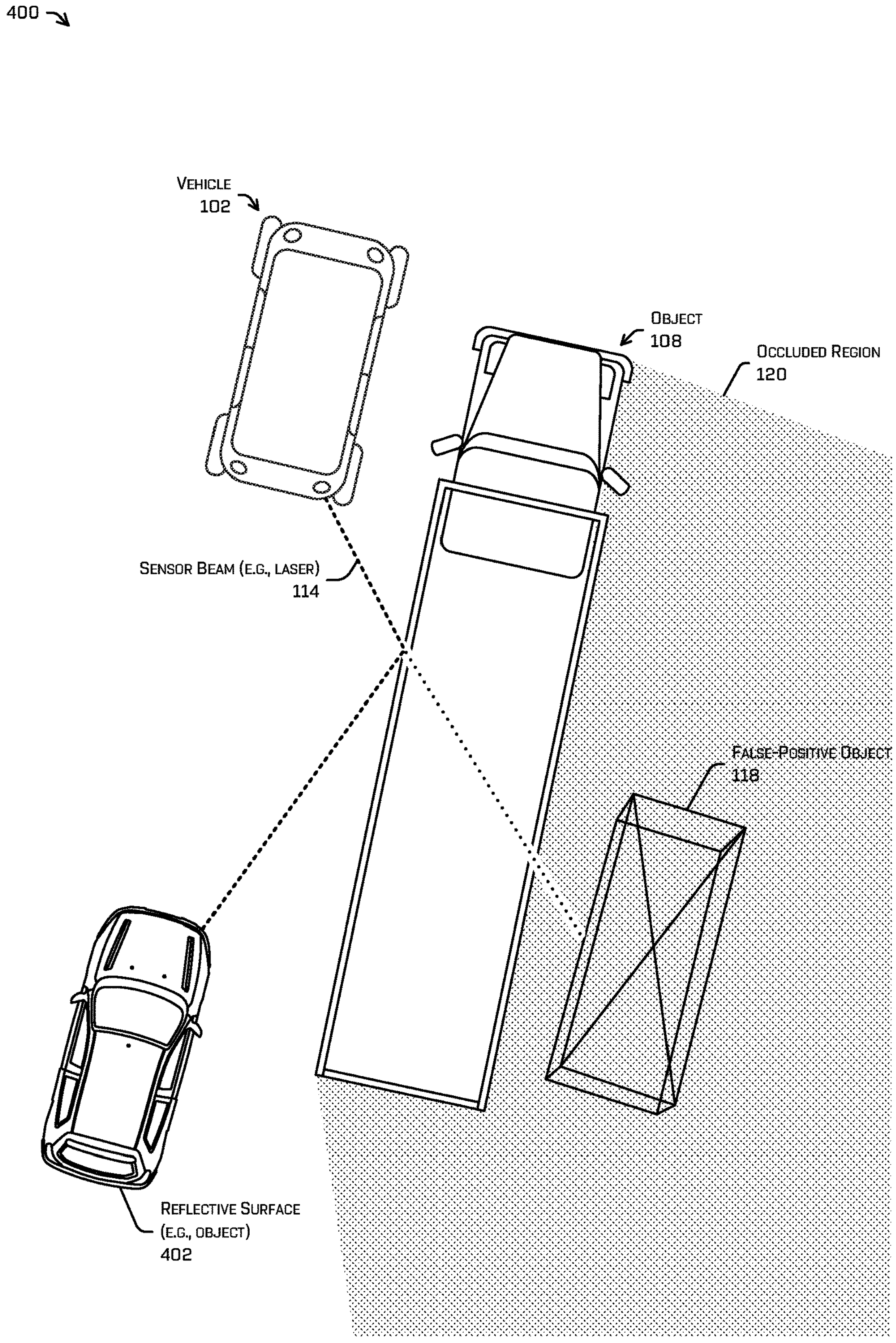
FIG. 4 is a top-down perspective view illustrating an example scenario in which a false-positive object may be detected in an environment.

FIG. 4 is a top-down perspective view illustrating an example scenario 400 in which a false-positive object may be detected in an environment. In the example shown in FIG. 4, the sensor beam 114 is projected out from the vehicle 102, the sensor beam 114 deflects off an object 108, and then the sensor beam reflects off a reflective surface 402, which is another object. As such, this condition causes the presence of the false-positive object 118 in sensor data or perception data. As illustrated in FIG. 4, a distance between the object 108 and the false-positive object 118 is similar to the distance between the object 108 and the reflective surface 402.

Figure 5:
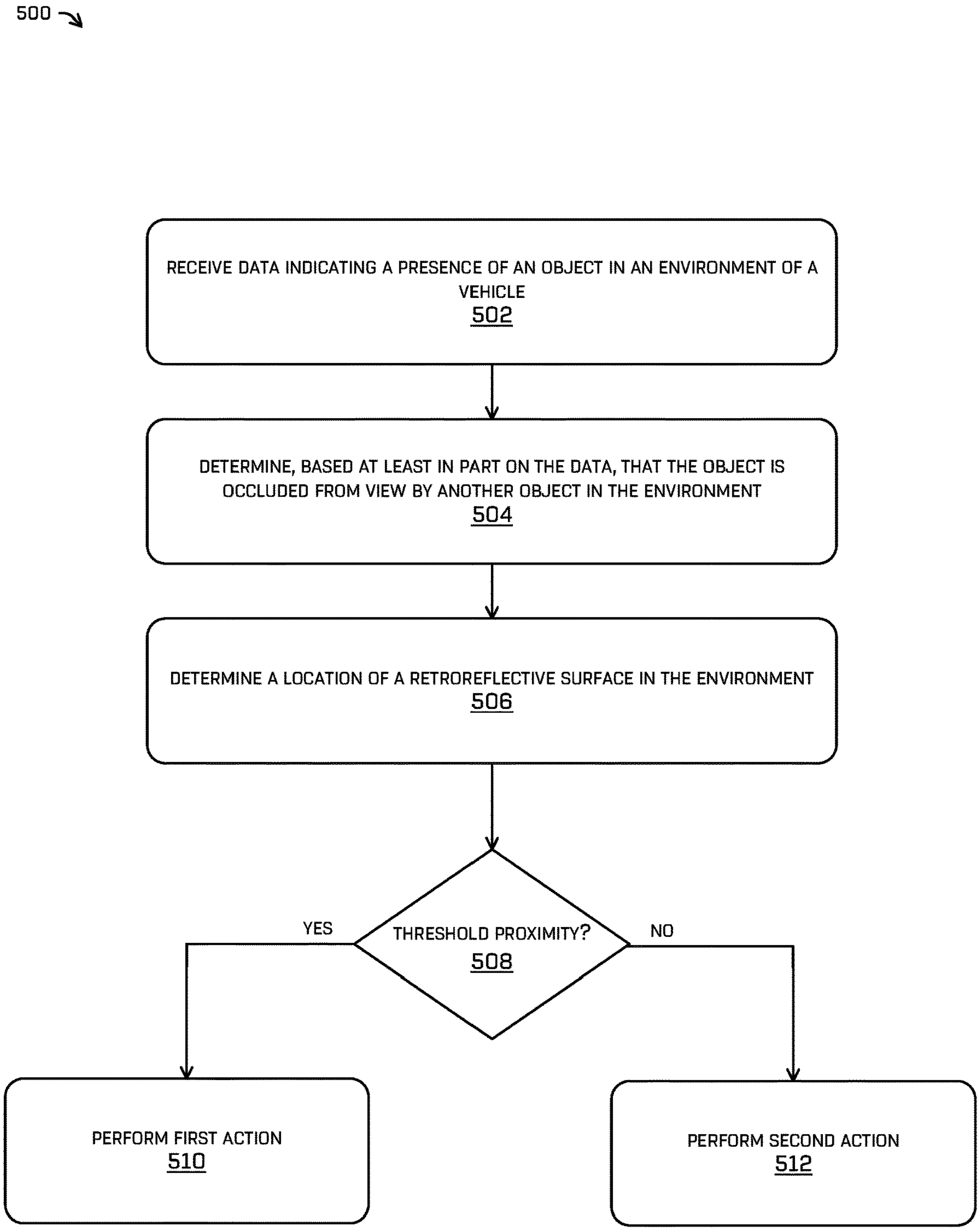
FIG. 5 is a flowchart illustrating an example process associated with the technologies disclosed herein for identifying false-positive objects.

FIG. 5 is a flowchart illustrating an example process 500 associated with the technologies disclosed herein for identifying false-positive objects. By way of example, the process 500 is illustrated as a logical flow graph, and each operation of it represents a sequence of operations that can be implemented in hardware, software, or a combination thereof. In the context of software, the operations may represent computer-executable instructions stored on one or more computer-readable storage media that, when executed by one or more processors, perform the recited operations. Generally, computer-executable instructions may include routines, programs, objects, components, data structures, and the like that perform particular functions or implement particular abstract data types.

In the process 500, the order in which the operations are described is not intended to be construed as a limitation, and any number of the described operations can be combined (or omitted) in any order and/or in parallel to implement the process 500. In some examples, multiple branches represent alternate implementations that may be used separately or in combination with other operations discussed herein. The process 500 illustrated may be described with reference to components and elements described above with reference to FIGS. 1-4 for convenience and ease of understanding. However, the process 500 is not limited to being performed using these components, and the components are not limited to performing the process 500.

The process 500 begins at operation 502, which includes receiving data indicating a presence of an object in an environment of a vehicle. For instance, the data integrity component 122 may receive the data indicating the presence of the object (e.g., the false-positive object 118 in the environment 106 of the vehicle 102. In some instances, the data integrity component 122 may receive sensor data 110 as inputs and/or may receive perception data 124 as inputs. In the case of sensor data, the sensor data may be lidar data that includes one or more three-dimensional point clouds indicative of various locations of objects in the environment. In the case of perception data, the perception data may include one or more bounding boxes (e.g., three-dimensional bounding boxes) indicative of locations of objects in the environment, orientations of objects, sizes of objects, and the like.

At operation 504, the process 500 includes determining, based at least in part on the data, that the object is occluded from view by another object in the environment. For instance, the data integrity component 122 and/or the perception component 116 may determine that the object (the false-positive object 118) is occluded from view (e.g., within the occluded region 120) by another object 108. In some examples, the occluded region may be a region of the environment that is occluded for each sensor of the vehicle. In some examples, the determination that the object is occluded from view by the other object may be based at least in part on sensor data (e.g., lidar data, image data, etc.), perception data, or other data.

At operation 506, the process 500 includes determining a location of a retroreflective surface in the environment. For instance, the data integrity component 122 and/or the perception component 116 may determine the location of the retroreflective surface 112 in the environment 106 based at least in part on the sensor data 110, the perception data 124, or other data. Additionally, or alternatively, the location of the retroreflective surface may be determined by the data integrity component 122 and/or the perception component 116 based at least in part on map data associated with the environment 106. For instance, the map data may indicate respective locations in the environment 106 where known, retroreflective surfaces are located. As such, the data integrity component 122 and/or the perception component 116 may utilize the map data, in some instances, as well as the sensor data 110 and/or the perception data 124 to determine the location of the retroreflective surface 112. Additionally, or alternatively, the location of the retroreflective surface 112 may be determined based at least in part on image data captured by an image sensor (e.g., camera) of the vehicle 102.

At operation 508, the process 500 includes determining whether the location of the retroreflective surface is within a threshold proximity of the other object. That is, if the retroreflective surface is located within the threshold proximity of the other object, then this may be a factor weighing in favor of an occluded object being a false-positive object. As such, if the location of the retroreflective surface is within the threshold proximity of the other object, the process 500 proceeds to operation 510. However, if the location of the retroreflective surface is not within the threshold proximity of the other object, the process 500 proceeds to operation 512. In additional, or alternative, examples, a determination may be made as to whether a difference in size between the object and the other object is less than a threshold difference, and the difference in size may be considered in determining whether the process 500 proceeds to operation 510 or 512, as described above and herein. That is, if the difference in size is less than a threshold difference, the process 500 may proceed to operation 510, in some instances.

In some instances, the data integrity component 122 may determine the threshold proximity based at least in part on a distance between the object (e.g., the potential false-positive object) and the other object. By way of example, and not limitation, if the distance between the object and the other object is 20 meters, then the data integrity component may determine the threshold proximity to be 15-25 meters. Additionally, in some instances, determining the threshold proximity may include determining a perimeter that is indicative of locations in the environment at which retroreflective surfaces, if located, could contribute to a false-positive object. In some examples, the perimeter may be a perimeter of a circle, and the radius of the circle may be equal to the distance between the object and the other object. As such, any retroreflective surfaces that are located along the perimeter of the circle, or within a threshold proximity of the perimeter, may be capable of causing the false-positive object.

At operation 510, the process 500 includes performing a first action. In examples, the first action may include determining, by the data integrity component 122, that the presence of the object is caused by a false-positive condition associated with the sensor beam(s) 114 of the sensor(s) 104 of the vehicle 102 reflecting off of the retroreflective surface 112. In some examples, the first action may further include labeling the object as a false-positive object. For instance, the data integrity component may label the object in perception data as the false-positive object so that downstream components, such as a planner component, prediction component, etc. of the vehicle do not give any deference to the false-positive object. That is, if the perception data is labeled with the false-positive object, the downstream components may refrain from altering or otherwise determining a trajectory for the vehicle to follow based on the location of the false-positive object. Additionally, or alternatively, in some examples, the data integrity component may remove any data associated with the false-positive object from perception data and/or sensor data. For instance, a bounding box associated with the false-positive object may be removed from the perception data by the data integrity component, or a point cloud associated with the false-positive object may be removed from lidar data by the data integrity component. In some examples, the first action may include controlling operation of the vehicle based at least in part on determining that the object is a false-positive object.

At operation 512, the process 500 includes performing a second action. In examples, the second action may include determining, by the data integrity component 122, that the object is a real object. That is, if the location of the retroreflective surface is not within the threshold proximity of the other object and/or if a difference in size between the object and the other object is less than a threshold difference, then the object may be determined to be a real object, in some instances. In some examples, the second action may include controlling operation of the vehicle based at least in part on determining that the object is a real object. Additionally, in some examples, the second action may include determining a predicted trajectory of the object.

Figure 6:
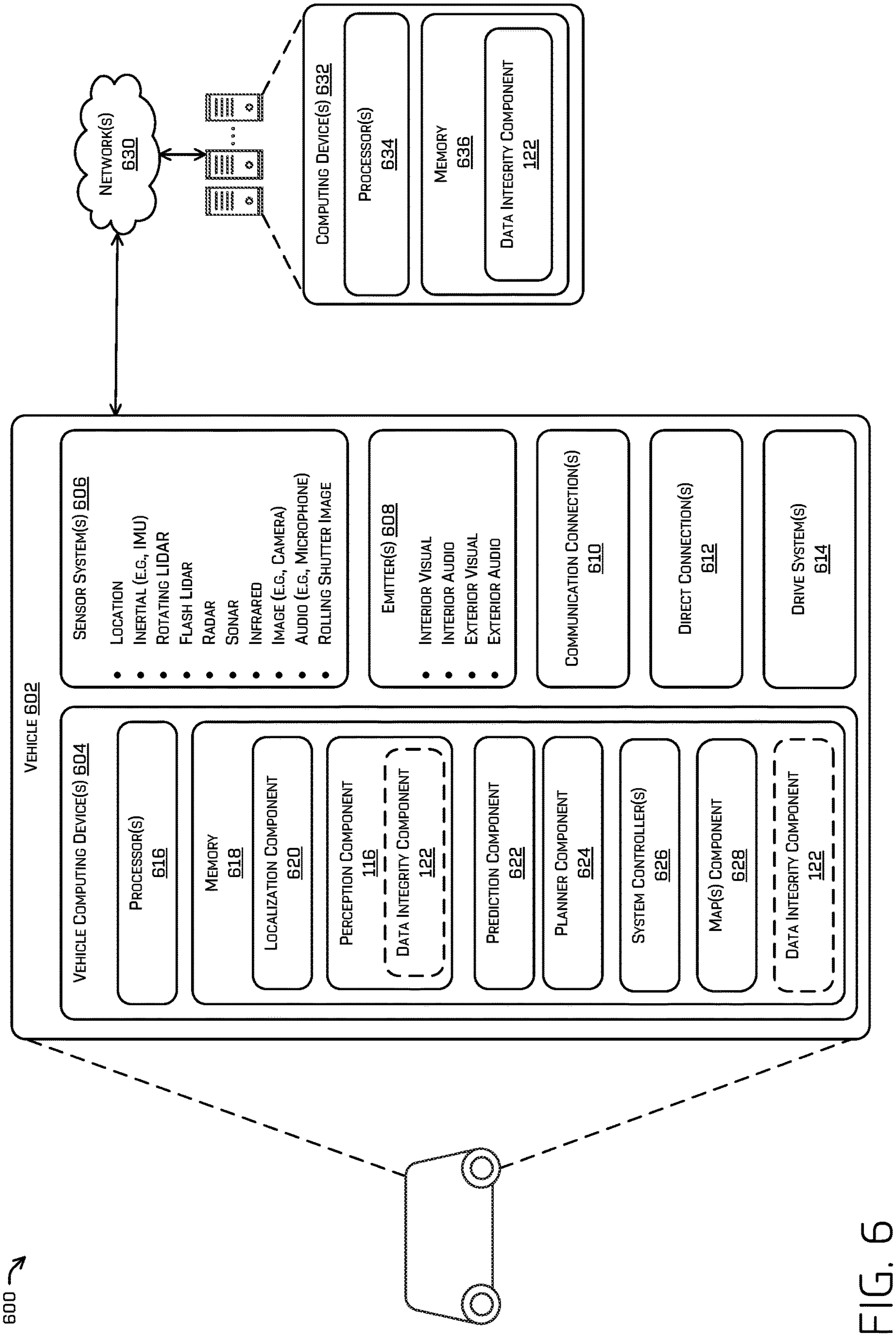
FIG. 6 is a block diagram illustrating an example system that may be used for performing the techniques described herein.

FIG. 6 is a block diagram illustrating an example system 600 that may be used for performing the techniques described herein. In at least one example, a vehicle 602, which can correspond to the vehicle 102 described above with reference to FIGS. 1-5, can include one or more vehicle computing device(s) 604, one or more sensor system(s) 606, one or more emitter(s) 608, one or more communication connection(s) 610, one or more direct connection(s) 612, and one or more drive system(s) 614.

In at least one example, a vehicle 602 can be an autonomous vehicle configured to operate according to a classification issued by the U.S. National Highway Traffic Safety Administration, which describes a vehicle capable of performing all safety-critical functions without the driver (or occupant) being expected to control the vehicle at any time. In such an example, since the vehicle 602 can be configured to control all functions from start to stop, including all parking functions, it can be unoccupied. This is merely an example, and the components and methods described herein can be incorporated into any ground-borne, airborne, or waterborne vehicle, including those ranging from vehicles that need to be manually controlled by a driver at all times, to those that are partially or fully autonomously controlled. That is, in the illustrated example, the vehicle 602 is an autonomous vehicle; however, the vehicle 602 could be any other type of vehicle. While only a single vehicle 602 is illustrated in FIG. 6, in a practical application, the example system 600 can include a plurality of vehicles, which, in some examples, can comprise a fleet of vehicles.

The vehicle computing device(s) 604 can include processor(s) 616 and memory 618 communicatively coupled with the processor(s) 616. In the illustrated example, the memory 618 of the vehicle computing device(s) 604 stores a localization component 620, the perception component 116, a prediction component 622, a planner component 624, one or more system controller(s) 626, a map(s) component 628, and the data integrity component 122, which may either be a standalone component or a subcomponent of the perception component 116.

In at least one example and as described above, the localization component 620 can determine a pose (position and orientation) of the vehicle 602 in relation to a local and/or global map based at least in part on sensor data received from the sensor system(s) 606 and/or map data associated with a map of an environment in which the vehicle 602 is operating (e.g., provided by the map(s) component 628). In at least one example, the localization component 620 can include, or be associated with, a calibration component that is capable of performing operations for calibrating (determining various intrinsic and extrinsic parameters associated with any one or more of the sensor system(s) 606), localizing, and mapping substantially simultaneously. In at least one example, the localization component 620 may provide localization data to the data integrity component 122 and the data integrity component 122 may use the localization data to determine a location of a retroreflective surface in an environment in relation to the vehicle 602.

In at least one example, the perception component 116 can perform object detection, segmentation, and/or classification based at least in part on sensor data received from the sensor system(s) 606. In at least one example, the perception component 116 can receive raw sensor data from the sensor system(s) 606. In at least one example, the perception component 116 can receive sensor data and can utilize one or more processing algorithms and/or machine-learned models to perform object detection, segmentation, and/or classification with respect to object(s) identified in the sensor data. In some examples, the perception component 116 can associate a bounding region (e.g., bounding box or otherwise an instance segmentation) with an identified object and can associate a confidence score associated with a classification of the identified object with the identified object. In examples, the perception component 116 can identify occluded regions in an environment. In at least one example, the perception component 116 can provide perception data to the data integrity component 122, and the data integrity component may use the perception data to determine whether an object in an environment of the vehicle 602, which may have been detected by the perception component 116, is a false-positive object.

The prediction component 622 can receive sensor data from the sensor system(s) 606, map data, and/or perception data output from the perception component 116 (e.g., processed sensor data) and can output predictions associated with one or more objects within the environment of the vehicle 602. Predictions can include predicted trajectories associated with objects in the environment in which the vehicle 602 is operating. In some examples, the prediction component 622 may receive outputs from the data integrity component indicating which objects in an environment are false-positive objects, and the prediction component 622 may refrain from outputting predictions associated with those false-positive objects.

The planner component 624 may receive data, information, and/or outputs from the localization component 620, the perception component 116, the prediction component 622, the map(s) component 628, and/or the data integrity component 122 and may generate one or more proposed vehicle operations (e.g., proposed trajectories). Additional details of localization components, perception components, prediction components, and/or planner components that are usable can be found in U.S. Pat. No. 9,612,123, issued on Apr. 4, 2017, and U.S. Pat. No. 10,363,390, issued on Jul. 16, 2019, the entire contents of both of which are incorporated by reference herein in their entirety and for all purposes. In some examples (e.g., where the vehicle 602 is not an autonomous vehicle), one or more of the aforementioned components can be omitted from the vehicle 602.

In at least one example, the vehicle computing device(s) 604 can include one or more system controller(s) 626, which can be configured to control steering, propulsion, braking, safety, emitters, communication, and other systems of the vehicle 602. These system controller(s) 626 can communicate with and/or control corresponding systems of the drive system(s) 614 and/or other systems of the vehicle 602.

The map(s) component 628 may store one or more map(s) associated with an environment in which the vehicle 602 operates. In some examples, the map(s) component 628 may include functionality to generate new maps representing an environment in real-time as the vehicle 602 operates, update maps associated with the environment, or the like. In at least one example, the map(s) component 628 can provide map data to the perception component 116 and/or the data integrity component 122, and those components may use the map data to determine respective locations in the environment of retroreflective surfaces. In some examples, the map data may indicate known locations in the environment of retroreflective surfaces, locations in the environment where retroreflective surfaces have previously caused false-positive objects, locations in the environment that are more likely to include retroreflective surfaces, and the like.

While the components described above are illustrated as "onboard" the vehicle 602, in other implementations, the components can be remotely located and/or accessible to the vehicle 602. For instance, some or all of the components can be remotely located on the computing device(s) 632 and accessible to the vehicle 602 via one or more network(s) 630. Furthermore, while the components are described above as "components," such components can comprise one or more components and/or modules, which can be part of a system, for performing operations attributed to each of the components.

In at least one example, the localization component 620, the perception component 116, the prediction component 622, the planner component 624, the map(s) component 628, and/or the data integrity component 122 can process data, as described above, and can send their respective outputs over the network(s) 630, to computing device(s) 632. In at least one example, the localization component 620, the perception component 116, the prediction component 622, the planner component 624, the map(s) component 628, and/or the data integrity component 122 can send their respective outputs to the computing device(s) 632 at a particular frequency, after a lapse of a predetermined period of time, in near real-time, etc.

In at least one example, the sensor system(s) 606 can include lidar sensors (e.g., rotating lidar sensors, flash lidar sensors), radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, audio sensors, environment sensors (e.g., temperature sensors, humidity sensors, light sensors, pressure sensors, etc.), ToF sensors, rolling shutter image sensors, etc. The sensor system(s) 606 can provide input to the vehicle computing device(s) 604. In some examples, the sensor system(s) 606 can preprocess at least some of the sensor data prior to sending the sensor data to the vehicle computing device(s) 604. In at least one example, the sensor system(s) 606 can send sensor data, via the network(s) 630, to the computing device(s) 632 at a particular frequency, after a lapse of a predetermined period of time, in near real-time, etc.

The vehicle 602 can also include one or more emitters 608 for emitting light and/or sound, as described above. The emitter(s) 608 in this example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, the emitter(s) 608 can be positioned at various locations about the exterior and/or interior of the vehicle 602.

The vehicle 602 can also include communication connection(s) 610 that enable communication between the vehicle 602 and other local or remote computing device(s), such as the computing device(s) 632, as well as other remote or local computing device(s). For instance, the communication connection(s) 610 can facilitate communication with other local computing device(s) on the vehicle 602 and/or the drive system(s) 614. Also, the communication connection(s) 610 can allow the vehicle to communicate with other nearby computing device(s) (e.g., other nearby vehicles, traffic signals, etc.). The communications connection(s) 610 also enable the vehicle 602 to communicate with a remote teleoperations computing device or other remote services.

The communications connection(s) 610 can include physical and/or logical interfaces for connecting the vehicle computing device(s) 604 to another computing device or a network, such as network(s) 630. For example, the communications connection(s) 610 can enable Wi-Fi-based communication such as via frequencies defined by the IEEE 602.11 standards, short range wireless frequencies such as BLUETOOTH®, or any suitable wired or wireless communications protocol that enables the respective computing device to interface with the other computing device(s).

The direct connection(s) 612 can directly connect the drive system(s) 614 and other systems of the vehicle 602. In at least one example, the vehicle 602 can include drive system(s) 614. In some examples, the vehicle 602 can have a single drive system 614. In at least one example, if the vehicle 602 has multiple drive systems 614, individual drive systems 614 can be positioned on opposite ends of the vehicle 602 (e.g., the front and the rear, etc.). In at least one example, the drive system(s) 614 can include sensor component(s) to detect conditions of the drive system(s) 614 and/or the surroundings of the vehicle 602. By way of example and not limitation, the sensor component(s) can include wheel encoder(s) (e.g., rotary encoders) to sense rotation of the wheels of the drive system, inertial sensors (e.g., inertial measurement units, accelerometers, gyroscopes, magnetometers, etc.) to measure position and acceleration of the drive system, cameras or other image sensors, ultrasonic sensors to acoustically detect objects in the surroundings of the drive system, lidar sensors, radar sensors, etc. Some sensors, such as the wheel encoder(s), can be unique to the drive system(s) 614. In some cases, the sensor component(s) on the drive system(s) 614 can overlap or supplement corresponding systems of the vehicle 602 (e.g., sensor system(s) 606).

The drive system(s) 614 can include many of the vehicle systems, including a high voltage battery, a motor to propel the vehicle 602, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 can include a drive system controller which can receive and preprocess data from the sensor component(s) and to control operation of the various vehicle systems. In some examples, the drive system controller can include processor(s) and memory communicatively coupled with the processor(s). The memory can store one or more components to perform various functionalities of the drive system(s) 614. Furthermore, the drive system(s) 614 also include communication connection(s) that enable communication by the respective drive system with other local or remote computing device(s).

In FIG. 6, the vehicle computing device(s) 604, sensor system(s) 606, emitter(s) 608, and the communication connection(s) 610 are shown onboard the vehicle 602. However, in some examples, the vehicle computing device(s) 604, sensor system(s) 606, emitter(s) 608, and the communication connection(s) 610 can be implemented outside of an actual vehicle (i.e., not onboard the vehicle 602).

As described above, the vehicle 602 can send data to the computing device(s) 632, via the network(s) 630. In some examples, the vehicle 602 can send raw sensor data to the computing device(s) 632. In other examples, the vehicle 602 can send processed sensor data and/or representations of sensor data to the computing device(s) 632 (e.g., data output from the localization component 620, the perception component 116, the prediction component 622, the planner component 624, the data integrity component 122, any machine-learned models, etc.). In some examples, the vehicle 602 can send data to the computing device(s) 632 at a particular frequency, after a lapse of a predetermined period of time, in near real-time, etc.

The computing device(s) 632 can receive the data (raw or processed) from the vehicle 602 and/or other data collection devices, as well as data from one or more third-party sources and/or systems. In at least one example, the computing device(s) 632 can include processor(s) 634 and memory 636 communicatively coupled with the processor(s) 634. In the illustrated example, the memory 636 of the computing device(s) 632 stores the data integrity component 122. In some examples, one or more of the systems and/or components can be associated with the vehicle 602 or other computing device(s) associated with the system 600 instead of, or in addition to, being associated with the memory 636 of the computing device(s) 632.

The processor(s) 616 of the vehicle 602 and the processor (s) 634 of the computing device(s) 632 can be any suitable processor capable of executing instructions to process data and perform operations as described herein. By way of example and not limitation, the processor(s) 616 and 634 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 618 and 636 are examples of non-transitory computer-readable media. Memory 618 and 636 can store an operating system and one or more software applications, instructions, programs, and/or data to implement the methods described herein and the functions attributed to the various systems. In various implementations, the memory can be implemented using any suitable memory technology, such as static random receive memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 6 is illustrated as a distributed system, in some examples, components of the vehicle 602 can be associated with the computing device(s) 632 and/or the components of the computing device(s) 632 can be associated with the vehicle 602. That is, the vehicle 602 can perform one or more of the functions associated with the computing device(s) 632, and vice versa.

Furthermore, while the vehicle computing device(s) 604 and the computing device(s) 632 are shown to include multiple components, in some examples, such components can be associated with more or fewer individual components. For example, the localization component 620, the perception component 116, the prediction component 622, the planner component 624, the map(s) component 628, and/or the data integrity component 122 can be combined into a single component. That is, while depicted as separate components, any one or more of the components can be combined.

EXAMPLE CLAUSES

A. A system comprising: one or more processors; and one or more non-transitory computer-readable media storing instructions that, when executed by the one or more processors, cause the system to perform operations comprising: receiving data associated with an environment in which a vehicle is operating, the data indicating a presence of an object in the environment, the presence of the object determined based at least in part on lidar data generated by a lidar sensor of the vehicle; determining that a location associated with the object is within an occluded region of the environment that, from a perspective of the lidar sensor, is occluded from view by another object in the environment; determining, based at least in part on the location associated with the object being within the occluded region, an existence of a geometrical relationship between the object, the other object, and the retroreflective surface; determining, based at least in part on the existence of the geometrical relationship, that the presence of the object is caused by a false-positive condition in which a laser emitted from the lidar sensor deflected off of the other object and reflected, back to the lidar sensor, off of the retroreflective surface; and based at least in part on determining that the presence of the object is caused by the false positive condition, at least one of: labeling the object in the data as a false-positive object that is absent from the environment; or precluding a bounding region associated with the object from being included in the data.

B. The system as recited in paragraph C, the operations further comprising: determining a first size associated with the object; determining a difference between the size associated with the object and a second size associated with the other object from a perspective of the lidar sensor; and wherein determining that the presence of the object is caused by the false-positive condition is further based at least in part on the difference between the first size and the second size.

C. The system as recited in any one of paragraphs A-B, the operations further comprising: determining a first distance between the other object and the retroreflective surface; determining a second distance between the object and the other object; and wherein determining the existence of the geometrical relationship between the object, the other object, and the retroreflective surface is further based at least in part on a difference between the first distance and the second distance being less than a threshold difference.

D. The system as recited in any one of paragraphs A-C, the operations further comprising determining a probability associated with the presence of the object being caused by the false-positive condition, wherein the at least one of labeling the object as the false positive object or precluding the bounding region associated with the object is further based at least in part on the probability being greater than a threshold probability.

E. A method comprising: receiving data indicating a presence of an object in an environment of a vehicle; determining, based at least in part on the data, that the object is occluded from view by another object in the environment; determining that a retroreflective surface in the environment is located within a threshold proximity of the object; and determining, based at least in part on the retroreflective surface being located within the threshold proximity of the object and based at least in part on the object being occluded from view by the other object, that the presence of the object is caused by a false positive condition associated with a signal from a sensor of the vehicle reflecting off of the retroreflective surface.

F. The method as recited in paragraph E, further comprising determining that a difference in size between the object and the other object is less than a threshold difference, wherein determining that the presence of the object is caused by the false positive condition is further based at least in part on the difference in size being less than the threshold difference.

G. The method as recited in any one of paragraphs E-F, further comprising determining the threshold proximity based at least in part on at least one of: a first distance between the other object and at least one of the retroreflective surface, the vehicle, or the object; or a second distance between the vehicle and at least one of the object, the other object, or retroreflective surface.

H. The method as recited in any one of paragraphs E-G, wherein determining the threshold proximity comprises determining a perimeter representing multiple locations in the environment at which objects, if located, are potential false-positive objects.

I. The method as recited in any one of paragraphs E-H, wherein the sensor is a lidar sensor and the false-positive condition is caused by a laser emitted from the lidar sensor being deflected off of the other object and reflected back to the lidar sensor off of the retroreflective surface.

J. The method as recited in any one of paragraphs E-I, wherein the data is perception data that is indicative of a location in the environment of the retroreflective surface, and wherein determining that the retroreflective surface is located within the threshold proximity of the object is based at least in part on the location.

K. The method as recited in any one of paragraphs E-J, further comprising determining a location of the retroreflective surface in the environment based at least in part on at least one of map data associated with the environment or sensor data associated with the environment, and wherein determining that the retroreflective surface is located within the threshold proximity of the object is based at least in part on determining the location.

L. The method as recited in any one of paragraphs E-K, further comprising at least one of: labeling the object as a false positive object that is absent from the environment; or precluding a bounding box associated with the object from perception output data that is to be processed by another component of the vehicle.

M. The method as recited in any one of paragraphs E-L, further comprising determining that a velocity associated with the object is less than a threshold velocity, and wherein determining that the presence of the object is caused by the false positive condition is further based at least in part on the velocity being less than the threshold velocity.

N. The method as recited in any one of paragraphs E-M, wherein the data is perception data including a bounding box associated with the object, the bounding box indicating that a location of the object is within a region of the environment that is occluded by the other object.

O. One or more non-transitory computer-readable media storing instructions that, when executed, cause one or more processors to perform operations comprising: receiving data indicating a presence of an object in an environment of a vehicle; determining, based at least in part on the data, that the object is occluded from view by another object in the environment; determining that a retroreflective surface in the environment is located within a threshold proximity of the object; and determining, based at least in part on the retroreflective surface being located within the threshold proximity of the object and based at least in part on the object being occluded from view by the other object, that the presence of the object is caused by a false positive condition associated with a signal from a sensor of the vehicle reflecting off of the retroreflective surface.

P. The one or more non-transitory computer-readable media as recited in paragraph O, the operations further comprising determining that a difference in size between the object and the other object is less than a threshold difference, wherein determining that the presence of the object is caused by the false positive condition is further based at least in part on the difference in size being less than the threshold difference.

Q. The one or more non-transitory computer-readable media as recited in any one of paragraphs O-P, the operations further comprising determining the threshold proximity based at least in part on at least one of: a first distance between the other object and at least one of the retroreflective surface, the vehicle, or the object; or a second distance between the vehicle and at least one of the object, the other object, or retroreflective surface.

R. The one or more non-transitory computer-readable media as recited in any one of paragraphs O-R, wherein determining the threshold proximity comprises determining a perimeter representing multiple locations in the environment at which objects, if located, are potential false-positive objects.

S. The one or more non-transitory computer-readable media as recited in any one of paragraphs O-R, wherein the sensor is a lidar sensor and the false-positive condition is caused by a laser emitted from the lidar sensor being deflected off of the other object and reflected back to the lidar sensor off of the retroreflective surface.

T. The one or more non-transitory computer-readable media as recited in any one of paragraphs O-S, wherein the data is perception data that is indicative of a location in the environment of the retroreflective surface, and wherein determining that the retroreflective surface is located within the threshold proximity of the object is based at least in part on the location.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions that, when executed by the one or more processors, cause the system to perform operations comprising:
receiving lidar data generated by a lidar sensor of a vehicle and associated with an environment in which the vehicle is operating, the lidar data indicating a presence of an object at a location in the environment;
determining that the location is within an occluded region of the environment that, from a perspective of the lidar sensor, is occluded from view by an intervening object located between the lidar sensor and the occluded region; determining, based at least in part on the location being within the occluded region, an existence of a geometrical relationship between the object, the intervening object, and a retroreflective surface;
determining, based at least in part on the existence of the geometrical relationship, a probability that the presence of the object is caused by a false-positive condition in which a laser emitted from the lidar sensor deflected off of the intervening object, reflected off of the retroreflective surface, deflected again off of the intervening object, and received by the lidar sensor; and
based at least in part on determining that said probability meets or exceeds a probability threshold, performing at least one of:
labeling the object in the lidar data as a false-positive object that is absent from the environment; or
precluding a bounding region associated with the object from being included in the lidar data.

2. The system of claim 1, the operations further comprising:
determining a first size associated with the object; and
determining a difference between the first size associated with the object and a second size associated with the intervening object from the perspective of the lidar sensor;
wherein determining that the presence of the object is caused by the false-positive condition is further based at least in part on the difference between the first size and the second size.

3. The system of claim 1, the operations further comprising:
determining a first distance between the intervening object and the retroreflective surface; and
determining a second distance between the object and the intervening object;
wherein determining the existence of the geometrical relationship between the object, the intervening object, and the retroreflective surface is further based at least in part on a difference between the first distance and the second distance being less than a threshold difference.

4. A method comprising:
receiving sensor data from a sensor of a vehicle, the sensor data indicating a presence of an object at a location in an environment;
determining, based at least in part on the sensor data, that the location is an occluded location that is occluded from view of the sensor by an intervening object located between the sensor and the occluded location;
determining that a retroreflective surface in the environment is located within a threshold proximity of the object;
determining that an object velocity associated with the object is less than a threshold velocity; and
determining, based at least in part on the object velocity being less than the threshold velocity, the retroreflective surface being located within the threshold proximity of the object, and the occluded location being occluded from view of the sensor, that the presence of the object is caused by a false-positive condition in which a sensor beam transmitted from the sensor deflected off of the intervening object, reflected off of the retroreflective surface, deflected again off of the intervening object, and was received by the sensor.

5. The method of claim 4, further comprising determining that a difference in size between the object and the intervening object is less than a threshold difference, wherein determining that the presence of the object is caused by the false-positive condition is further based at least in part on the difference in size being less than the threshold difference.

6. The method of claim 4, further comprising determining the threshold proximity based at least in part on at least one of:
a first distance between the intervening object and at least one of the retroreflective surface, the vehicle, or the object; or a second distance between the vehicle and at least one of the object, the intervening object, or the retroreflective surface.

7. The method of claim 6, wherein determining the threshold proximity comprises determining a perimeter representing multiple locations in the environment at which objects, if located, are potential false-positive objects.

8. The method of claim 4, wherein the sensor is a lidar sensor and the false-positive condition is caused by a laser emitted from the lidar sensor being deflected off of the intervening object and reflected back to the lidar sensor off of the retroreflective surface.

9. The method of claim 4, wherein the sensor data is perception data that is indicative of a location in the environment of the retroreflective surface, and wherein determining that the retroreflective surface is located within the threshold proximity of the object is based at least in part on the location.

10. The method of claim 4, further comprising determining a location of the retroreflective surface in the environment based at least in part on at least one of map data associated with the environment or the sensor data, and wherein determining that the retroreflective surface is located within the threshold proximity of the object is based at least in part on determining the location.

11. The method of claim 4, further comprising at least one of:

labeling the object as a false-positive object that is absent from the environment; or precluding a bounding box associated with the object from perception output data that is to be processed by another component of the vehicle.

12. The method of claim 4, wherein the sensor data is perception data including a bounding box associated with the object, the bounding box indicating that a location of the object is within a region of the environment that is occluded by the intervening object.

13. One or more non-transitory computer-readable media storing instructions that, when executed, cause one or more processors to perform operations comprising:

receiving sensor data from a sensor of a vehicle, the sensor data indicating a presence of an object at a location in an environment;

determining, based at least in part on the sensor data, that the location is an occluded location that is occluded from view of the sensor by an intervening object located between the sensor and the occluded location;

determining that a retroreflective surface in the environment is located within a threshold proximity of the object;

determining that a difference in size between the object and the intervening object is less than a threshold difference; and determining, based at least in part on the difference in size being less than the threshold difference, the retroreflective surface being located within the threshold proximity of the object, and the occluded location being occluded from view of the sensor, that the presence of the object is caused by a false-positive condition in which a sensor beam transmitted from the sensor deflected off of the intervening object, reflected off of the retroreflective surface, deflected again off of the intervening object, and was received by the sensor.

14. The one or more non-transitory computer-readable media of claim 13, the operations further comprising determining the threshold proximity based at least in part on at least one of:

a first distance between the intervening object and at least one of the retroreflective surface, the vehicle, or the object; or a second distance between the vehicle and at least one of the object, the intervening object, or the retroreflective surface.

15. The one or more non-transitory computer-readable media of claim 14, wherein determining the threshold proximity comprises determining a perimeter representing multiple locations in the environment at which objects, if located, are potential false-positive objects.

16. The one or more non-transitory computer-readable media of claim 13, wherein the sensor is a lidar sensor and the false-positive condition is caused by a laser emitted from the lidar sensor being deflected off of the intervening object and reflected back to the lidar sensor off of the retroreflective surface.

17. The one or more non-transitory computer-readable media of claim 13, wherein the sensor data is perception data that is indicative of a location in the environment of the retroreflective surface, and wherein determining that the retroreflective surface is located within the threshold proximity of the object is based at least in part on the location.

* * * * *